(12) United States Patent
Dal Mutto et al.

(10) Patent No.: US 10,296,603 B2
(45) Date of Patent: May 21, 2019

(54) SYSTEMS AND METHODS FOR AUTOMATICALLY GENERATING METADATA FOR MEDIA DOCUMENTS

(71) Applicant: AQUIFI, INC., Palo Alto, CA (US)

(72) Inventors: Carlo Dal Mutto, Sunnyvale, CA (US); Alvise Memo, Marcon (IT); Duc Nguyen, Alameda, CA (US); Abbas Rafii, Palo Alto, CA (US); Jason Trachewsky, Menlo Park, CA (US)

(73) Assignee: AQUIFI, INC., Palo Alto, CA (US)

( * ) Notice: Subject to any disclaimer, the term of this patent is extended or adjusted under 35 U.S.C. 154(b) by 0 days.

(21) Appl. No.: 15/675,684

(22) Filed: Aug. 11, 2017

(65) Prior Publication Data

US 2018/0046649 A1 Feb. 15, 2018

Related U.S. Application Data

(60) Provisional application No. 62/374,598, filed on Aug. 12, 2016.

(51) Int. Cl.
*G06F 17/30* (2006.01)
*G06N 3/02* (2006.01)

(52) U.S. Cl.
CPC .... *G06F 17/30271* (2013.01); *G06F 17/3002* (2013.01); *G06F 17/30011* (2013.01); *G06N 3/02* (2013.01)

(58) Field of Classification Search
CPC ............. G06F 17/30259; G06F 17/30277
USPC ................................ 707/722; 382/209
See application file for complete search history.

(56) References Cited

U.S. PATENT DOCUMENTS

| 5,594,844 A † | 1/1997 | Sakai et al. |
| 7,148,859 B2 † | 12/2006 | Suyama et al. |
| 8,485,668 B2 † | 7/2013 | Zhang et al. |
| 8,675,988 B2 † | 3/2014 | Chen et al. |
| 8,686,992 B1 * | 4/2014 | Makadia ............ G06K 9/00214 345/419 |

(Continued)

OTHER PUBLICATIONS

Su et al., "Multi-view Convolutional Neural Networks or 3D Shape Recognition", Feb. 18, 2016, Published in 2015 IEEE International Conference on Computer Vision (ICCV) (Year: 2016).*

(Continued)

*Primary Examiner* — Hosain T Alam
*Assistant Examiner* — Robert F May
(74) *Attorney, Agent, or Firm* — Lewis Roca Rothgerber Christie LLP

(57) ABSTRACT

According to one embodiment of the present invention, a method for automatically generating metadata for a media document includes: computing a feature vector of the media document using a convolutional neural network; searching a collection of media documents for one or more matching media documents having corresponding feature vectors similar to the feature vector of the media document, each media document of the collection of media documents being associated with metadata; generating metadata for the media document based on the metadata associated with the one or more matching media documents; and displaying the media document in association with the generated metadata.

24 Claims, 10 Drawing Sheets
(4 of 10 Drawing Sheet(s) Filed in Color)

(56) References Cited

U.S. PATENT DOCUMENTS

| | | | |
|---|---|---|---|
| 8,811,674 | B2 † | 8/2014 | Brown et al. |
| 9,008,433 | B2 † | 4/2015 | Fork et al. |
| 2004/0249809 | A1* | 12/2004 | Ramani .............. G06F 17/30259 |
| 2010/0080470 | A1* | 4/2010 | Deluca ............... G06K 9/00664 382/209 |
| 2010/0284607 | A1* | 11/2010 | Van Den Hengel .... G06T 7/564 382/154 |
| 2012/0271814 | A1* | 10/2012 | Krishnaprasad .. G06F 17/30471 707/713 |
| 2014/0222755 | A1* | 8/2014 | Soderberg ......... G06F 17/30265 707/609 |
| 2014/0253735 | A1* | 9/2014 | Fox ...................... H04N 5/2252 348/164 |
| 2015/0016667 | A1* | 1/2015 | Algreatly ........... G06K 9/00201 382/103 |
| 2015/0178908 | A1 † | 6/2015 | Jesenko et al. |
| 2016/0063035 | A1* | 3/2016 | Rejal ................. G06F 17/30259 707/754 |
| 2016/0086017 | A1* | 3/2016 | Rodriguez ......... G06K 9/00288 382/118 |
| 2016/0154999 | A1 † | 6/2016 | Fan et al. |
| 2016/0189009 | A1* | 6/2016 | Tran ................... G06K 9/00744 382/158 |
| 2017/0004621 | A1* | 1/2017 | Maranzana ............. G06F 17/50 |
| 2017/0060904 | A1* | 3/2017 | Pau ................... G06F 17/30268 |
| 2017/0103510 | A1* | 4/2017 | Wang .................... G06T 7/0002 |
| 2017/0116498 | A1* | 4/2017 | Raveane ................. G06N 3/10 |
| 2017/0201735 | A1* | 7/2017 | Tyshchenko ............. G06T 7/50 |
| 2017/0228940 | A1* | 8/2017 | Kutliroff ................ G06T 19/20 |

OTHER PUBLICATIONS

Shi, Baoguang et al., DeepPano: Deep Panoramic Representation for 3-D Shape Recognition, IEEE Signal Processing Letters, 2015, pp. 1-5.

Fei-Fei, Li et al., A Bayesian Hierarchical Model for Learning Natural Scene Categories, 2005, pp. 1-8.

Deng, Jia et al., ImageNet: A Large-Scale Hierarchical Image Database, Dept. of Computer Science, Princeton University, USA, pp. 1-8.

Observe the World in 3D, Intel® RealSense™ Technology, httos://www.intel.com/content/www/us/en/architecture-and-technology, accessed Oct. 24, 2018, 4 pages.

Johns, Edward et al., Pairwise Decomposition of Image Sequences for Active Multi-View Recognition, Computer Vision Foundation, 2016, pp. 3813-3822.

Krizhevsky, Alex et al., ImageNet Classification with Deep Convolutional Neural Networks, Advances in Neural Information Processing Systems, 2012, pp. 1-9.

LeCun, Y. et al., Backpropagation Applied to Handwritten Zip Code Recognition, Neural Computation 1, 1989, pp. 541-551, Massachusetts Institute of Technology.

Cignoni, P. et al., MeshLab: an Open-Source Mesh Processing Tool, The Eurographics Association, 2008, 8 pages.

Su, Hang et al., Multi-view Convolutional Neural Networks for 3D Shape Recognition, Computer Vision Foundation, 2015, pp. 945-953.

Szegedy, Christian et al., Going Deeper with Convolutions, Computer Vision Foundation, 2015, pp. 1-9.

Text Analytics for App Developers and Data Scientists—What Can Data Ninja Services Do?, Text Analytics API—Data Ninja, http://web.archive.orb/web/20171022131138/https://www.dataninja.net, accessed Oct. 24, 2018, 2 pages.

Wu, Zhirong et al., 3D ShapeNets: A Deep Representation for Volumetric Shapes, Computer Vision Foundation, 2015, pp. 1912-1920.

International Search Report and Written Opinion dated Oct. 19, 2017 for corresponding PCT Application No. PCT/US2017/046642 (15 pages).†

\* cited by examiner
† cited by third party

SYSTEMS AND METHODS FOR AUTOMATICALLY GENERATING METADATA FOR MEDIA DOCUMENTS

CROSS-REFERENCE TO RELATED APPLICATION(S)

This application claims the benefit of U.S. Provisional Patent Application No. 62/374,598, filed in the United States Patent and Trademark Office on Aug. 12, 2016, the entire disclosure of which is incorporated by reference herein.

FIELD

Aspects of embodiments of the present invention relate to the field of digital media tagging and classification, including image and 3D model tagging and classification, and associated user interface systems.

BACKGROUND

Various types of digital media documents, such as images, audio recordings, and videos, often include metadata that includes textual descriptions of the digital media document. This metadata may include information such as a timestamp, as well as tags and/or narrative descriptions of the content of the associated digital media document. These metadata may be used when performing text based searches in order to identify media documents that are relevant to the search query. The metadata may also be used to categorize or classify the digital media documents.

As one example, the metadata associated with a digital photo may include technical information such as the dimensions of the image (in pixels) and the color depth of the image, as well as metadata describing the content of the photo. The metadata associated with a photograph of a hiker in a forest may include textual descriptions of the content of the photograph, such as a "woods," "forest," "trees," "plants," "green," "shadow," "flower," "hike," "hiker," "hiking," etc.

Three-dimensional (3D) models are another form of digital media document, and are prevalently used in contexts such as advertising, quality control, video games, virtual reality, and augmented reality applications. In the past, 3D models were generated manually through the use of, for example, computer aided design (CAD) tools. Creating these models is, generally, a labor intensive task, especially when creating detailed models. More recently, depth cameras and 3D scanners have provided an alternative approach, in which detailed 3D models can be created through the digital capture of the shapes of real, physical objects.

The three-dimensional models generated using CAD tools, depth cameras, and 3D scanners may also benefit from metadata tagging. For example, 3D models may be used in product listings on electronic commerce websites, and the metadata associated with the 3D models may be used to generate or populate the information in the associated product listings. For example, a 3D model of a vehicle may include metadata information such as the make and model of the car, the interior and exterior color, condition (e.g., presence of dents or damage), and the like. These metadata can be added to the information in the product listing, such that a shopper can search for a particular type of car in a particular color.

However, manually generating these metadata for each 3D model can be time consuming, and can cause inconsistent and poorly organized results. For example, a car may be tagged as being "red" whereas the actual name of the shade of red may be "ruby." Other information about the vehicle may be incorrect, such as the spelling of the name of the particular model.

SUMMARY

Aspects of embodiments of the present invention are directed to automatically augmenting three-dimensional (3D) models with metadata, and systems for collecting and generating those 3D models.

According to one embodiment of the present invention, a method for automatically generating metadata for a media document includes: computing a feature vector of the media document using a convolutional neural network; searching a collection of media documents for one or more matching media documents having corresponding feature vectors similar to the feature vector of the media document, each media document of the collection of media documents being associated with metadata; generating metadata for the media document based on the metadata associated with the one or more matching media documents; and displaying the media document in association with the generated metadata.

The media document may be a three-dimensional (3D) model. The computing the feature vector may include: defining a bounding box around the 3D model to generate a bounded 3D model; voxelizing the bounded 3D model to compute a plurality of voxels; and generating the feature vector from the voxels. The collection of media documents may include a collection of three-dimensional (3D) models, and the searching the collection of media documents may include computing a distance between the 3D model and one of the 3D models of the collection of 3D models in accordance with an iterative closest point technique. The computing the feature vector may include: rendering the 3D model from multiple angles to render a plurality of two-dimensional (2D) views of the 3D model; generating, using one or more convolutional neural networks, a plurality of single view feature vectors, each of the single view feature vectors corresponding to one of the 2D views of the 3D model; pooling the plurality of single view feature vectors to compute a pooled feature vector; and computing the feature vector from the pooled feature vector using a final stage convolutional neural network. The collection of media documents may include a collection of two-dimensional (2D) images, the computing the feature vector may include computing one or more feature vectors of the 3D model, the one or more matching media documents may include one or more matching 2D images of the collection of 2D images, and each of the corresponding feature vectors of the matching 2D images may be similar to at least one of the one or more feature vectors of the 3D model. The method may further include: capturing the 3D model using a three-dimensional scanner, the three-dimensional scanner including: two or more infrared (IR) cameras; and one or more IR collimated illuminators.

The media document may include one or more two-dimensional (2D) images, the collection of media documents may include a collection of three-dimensional (3D) models, the computing the feature vector may include computing one or more feature vectors of the one or more 2D images, the one or more matching media documents may include one or more matching 3D models of the collection of 3D models, and each of the corresponding feature vectors of the matching 3D models may be similar to at least one of the one or more feature vectors of the 3D model. The computing the feature vector may include: computing a 3D model of an object from the one or more 2D images; and extracting the feature vector from the 3D model. The extracting the feature vector from the 3D model may include: defining a bounding box around the 3D model to generate a bounded 3D model; voxelizing the bounded 3D model to compute a plurality of voxels; and generating the feature vector from the voxels.

The extracting the feature vector from the 3D model may include: rendering the 3D model from multiple angles to render a plurality of two-dimensional (2D) views of the 3D model; generating, using one or more convolutional neural networks, a plurality of single view feature vectors, each of the single view feature vectors corresponding to one of the 2D views of the 3D model; pooling the plurality of single view feature vectors to compute a pooled feature vector; and computing the feature vector from the pooled feature vector using a final stage convolutional neural network.

The method may further include receiving user input, the user input including a validation of one or more of a plurality of fields of the generated metadata.

The generated metadata and the metadata associated with each of the media documents each may include a plurality of fields, and the generating the metadata may include: identifying, for each field of the plurality of fields, data that appears in more than a threshold number of the metadata of the one or more matching media documents, and adding the identified data to the generated metadata.

The generated metadata may include a class of the media document, and the method may further include: supplying the feature vector of the media document to a classifier to compute classifications of the media document; and computing the class based on the classifications.

The method may further include adding the media document and the generated to the collection of media documents.

Each of the one or more corresponding feature vectors of the one or more matching media documents may have a corresponding distance in multi-dimensional space from the feature vector of the media document, and each corresponding distance may be less than a threshold distance.

The method may further include receiving metadata associated with the media document, wherein the searching the collection of media document may include identifying one or more media documents of the collection of media documents having metadata matching at least one of a plurality of fields of the metadata associated with the media document, and wherein the matching media documents may include at least one of the identified one or more media documents.

The collection of media documents may include a first set of media documents and a second set of media documents, wherein an access policy associated with a user permits access to the first set of media documents and denies access to the second set of media documents, and wherein the searching the collection of media documents is restricted to the first set of media documents.

According to one embodiment of the present invention, a system for automatically generating metadata for a media document includes: a processor; and memory having instructions stored thereon that, when executed by the processor, cause the processor to: compute a feature vector of the media document using a convolutional neural network; search a collection of media documents for one or more matching media documents having corresponding feature vectors similar to the feature vector of the media document, each media document of the collection of media documents being associated with metadata; generate metadata for the media document based on the metadata associated with the one or more matching media documents; and display the media document in association with the generated metadata.

The media document may be a three-dimensional (3D) model. The instructions for computing the feature vector may include instructions that, when executed by the processor, cause the processor to: define a bounding box around the 3D model to generate a bounded 3D model; voxelize the bounded 3D model to compute a plurality of voxels; and generate the feature vector from the voxels. The collection of media documents may include a collection of three-dimensional (3D) models, and the instructions for searching the collection of media documents may include instructions that, when executed by the processor, cause the processor to compute a distance between the 3D model and one of the 3D models of the collection of 3D models in accordance with an iterative closest point technique. The instructions for computing the feature vector may include instructions that, when executed by the processor, cause the processor to: render the 3D model from multiple angles to render a plurality of two-dimensional (2D) views of the 3D model; generate, using one or more convolutional neural networks, a plurality of single view feature vectors, each of the single view feature vectors corresponding to one of the 2D views of the 3D model; pool the plurality of single view feature vectors to compute a pooled feature vector; and compute the feature vector from the pooled feature vector using a final stage convolutional neural network. The collection of media documents may include a collection of two-dimensional (2D) images, the instructions for computing the feature vector may include instructions that, when executed by the processor, cause the processor to compute one or more feature vectors of the 3D model, the one or more matching media documents may include one or more matching 2D images of the collection of 2D images, and each of the corresponding feature vectors of the matching 2D images may be similar to at least one of the one or more feature vectors of the 3D model. The system may further include a three-dimensional scanner including: two or more infrared (IR) cameras; and one or more IR collimated illuminators, wherein the memory may further store instructions that, when executed by the processor, cause the processor to capture the 3D model using the three-dimensional scanner.

The media document may include one or more two-dimensional (2D) images, the collection of media documents may include a collection of three-dimensional (3D) models, the instructions for computing the feature vector may include instructions that, when executed by the processor, cause the processor to compute one or more feature vectors of the one or more 2D images, the one or more matching media documents may include one or more matching 3D models of the collection of 3D models, and each of the corresponding feature vectors of the matching 3D models may be similar to at least one of the one or more feature vectors of the 3D model. The instructions for computing the feature vector may include instructions that, when executed by the processor, cause the processor to: compute a 3D model of an object from the one or more 2D images; and extract the feature vector from the 3D model. The instructions for extracting the feature vector from the 3D model may include instructions that, when executed by the processor, cause the processor to: define a bounding box around the 3D model to generate a bounded 3D model; voxelize the bounded 3D model to compute a plurality of voxels; and generate the feature vector from the voxels. The instructions for extracting the feature vector from the 3D model may include instructions that, when executed by the processor, cause the processor to: render the 3D model from multiple angles to render a plurality of two-dimensional (2D) views of the 3D model; generate, using one or more convolutional neural networks, a plurality of single view feature vectors, each of the single view feature vectors corresponding to one of the 2D views of the 3D model; pool the plurality of single view feature vectors to compute a pooled feature vector; and compute the feature vector from the pooled feature vector using a final stage convolutional neural network.

The memory may further store instructions that, when executed by the processor, cause the processor to receive user input, the user input including a validation of one or more of a plurality of fields of the generated metadata.

The generated metadata and the metadata associated with each of the media documents may each include a plurality of fields, and the instructions for generating the metadata may include instructions that, when executed by the processor, cause the processor to: identify, for each field of the plurality of fields, data that appears in more than a threshold number of the metadata of the one or more matching media documents, and add the identified data to the generated metadata.

The generated metadata may include a class of the media document, and the memory may further store instructions that, when executed by the processor, cause the processor to: supply the feature vector of the media document to a classifier to compute classifications of the media document; and compute the class based on the classifications.

The memory may further store instructions that, when executed by the processor, cause the processor to add the media document and the generated to the collection of media documents.

Each of the one or more corresponding feature vectors of the one or more matching media documents may have a corresponding distance in multi-dimensional space from the feature vector of the media document, and each corresponding distance may be less than a threshold distance.

The memory may further store instructions that, when executed by the processor, cause the processor to receive metadata associated with the media document, wherein the instructions for searching the collection of media document may include instructions that, when executed by the processor, cause the processor to identify one or more media documents of the collection of media documents having metadata matching at least one of a plurality of fields of the metadata associated with the media document, and wherein the matching media documents may include at least one of the identified one or more media documents.

The collection of media documents may include a first set of media documents and a second set of media documents, wherein an access policy associated with a user permits access to the first set of media documents and denies access to the second set of media documents, and wherein the searching the collection of media documents is restricted to the first set of media documents.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

DETAILED DESCRIPTION

Figure 1:
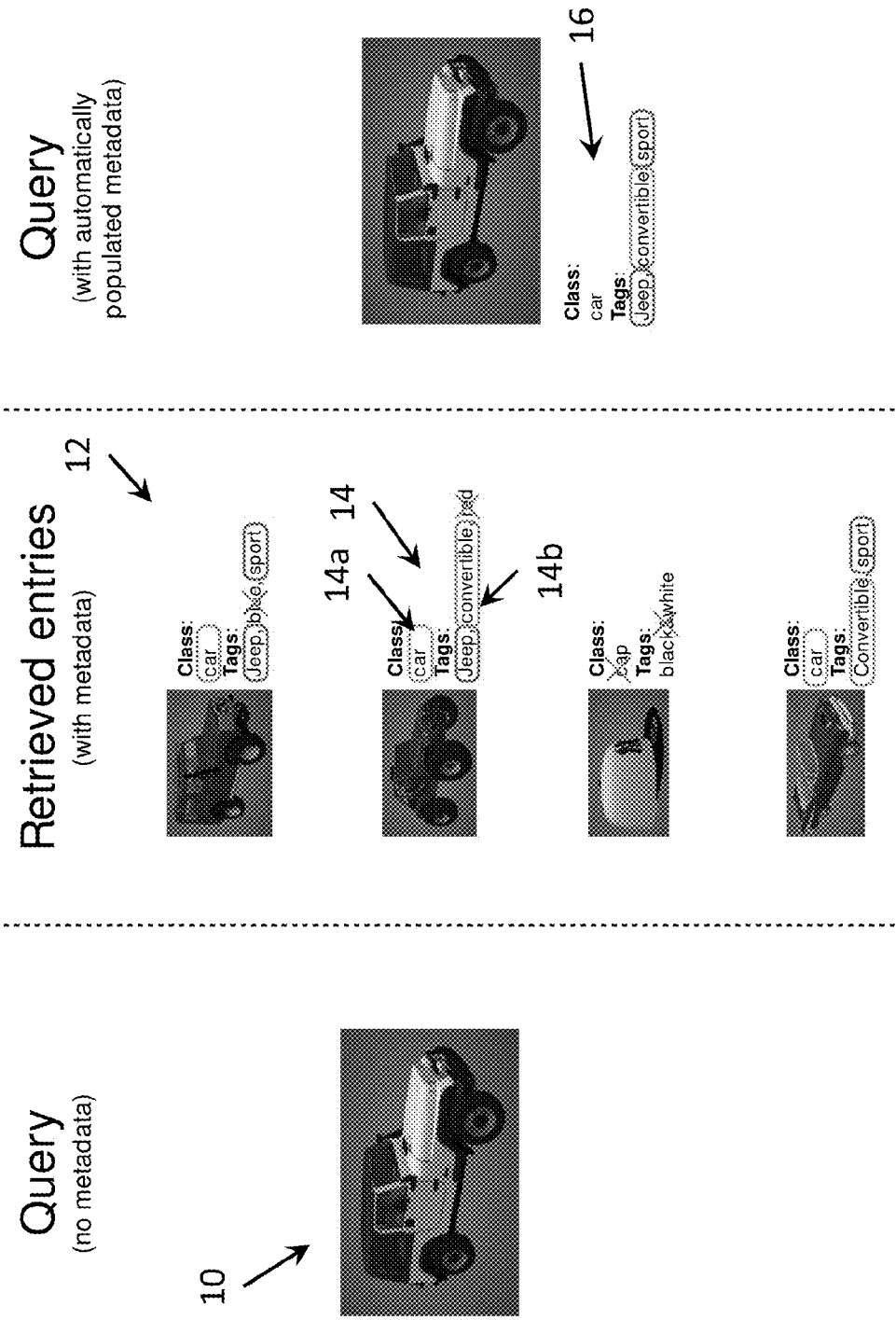
FIG. 1 is an example of the automatic population of tags and classes of metadata according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention are directed to systems and methods for automatically generating metadata for a media document such as a two-dimensional (2D) image or a three-dimensional (3D) model. The 3D model may be generated by a scanner system, scanner system having a depth camera, as described in more detail below. Some aspects of embodiments of the present invention relate to supplying the media document to a feature extractor to generate a feature vector and to supply the feature vector to a classifier that is trained or configured to classify the media document in accordance with a set of classifications. Still other aspects of embodiments of the present invention relate to searching a collection of media documents (e.g., stored in a database) to identify existing media documents having similar classifications (e.g., a similar feature vector). The metadata associated with these media documents having similar classifications may then be used to generate metadata for the supplied media document.

FIG. 1 is an example of the automatic population of tags and classes of metadata according to one embodiment of the present invention. As shown in FIG. 1, a 3D model 10 is used as the media model that is supplied as a query. In the example shown, the 3D model 10 does not have any associated metadata. Based on the query including the 3D model 10, an embodiment of the present invention identifies entries 12 in a collection of media documents (a collection of 3D models) that are similar to the 3D model 10 supplied in the query. Each of the identified entries 12 is associated with metadata 14 including a class 14a and tags 14b. For example, the first entry shows a model of a blue sport utility vehicle with class "car" and tags "Jeep, blue, sport". The second entry shows a model of a red, open top, off road vehicle with class "car" and tags "Jeep, convertible, red." The third entry shows a model of a baseball cap with class "cap" and tags "black & white." The fourth entry shows a model of a green, open top car with class "car" and tags "convertible" and "sport." By merging the metadata that appear in at least half of the identified entries 12, metadata 16 can be generated for the supplied 3D model 10 of the query.

This approach may be particularly useful in the case of a 3D model generated by a scanner system, where such a generated 3D model may have substantially no metadata, such as in the case of a user who captured a 3D model of his or her car, using a 3D scanner system, in order to include the 3D model of the car in an advertisement (e.g., a product listing on an online auction website) to sell the car.

This approach further allows the system to automatically classify and tag an object, even when the user capturing the image or 3D model of the object does not know what the object is or what the object is called.

Scanner Systems

Generally, scanner systems include hardware devices that include a sensor, such as a camera, that collects data from a scene. The scanner systems may include a computer processor or other processing hardware for generating depth images and/or three-dimensional (3D) models of the scene from the data collected by the sensor.

The sensor of a scanner system may be, for example one of a variety of different types of cameras including: an ordinary color camera; a depth (or range) camera; or a combination of depth and color camera. The latter is typically called RGB-D where RGB stands for the color image and D stands for the depth image (where each pixel encodes the depth (or distance) information of the scene.) The depth image can be obtained by different methods including geometric or electronic methods. A depth image may be represented as a point cloud or may be converted into a point cloud. Examples of geometric methods include passive or active stereo camera systems and structured light camera systems. Examples of electronic methods to capture depth images include Time of Flight (TOF), or general scanning or fixed LIDAR cameras.

Depending on the type of camera, different algorithms may be used to generate depth images from the data captured by the camera. A class of algorithms called Dense Tracking and Mapping in Real Time (DTAM) uses color cues in the captured images, while another class of algorithms referred to as Simultaneous Localization and Mapping (SLAM) uses depth (or a combination of depth and color) data, while yet another class of algorithms are based on the Iterative Closest Point (ICP) and its derivatives.

As described in more detail below with respect to FIG. 2, at least some depth camera systems allow a user to freely move the camera around the object to capture all sides of the object. The underlying algorithm for generating the combined depth image may track and/or infer the pose of the camera with respect to the object in order to align the captured data with the object or with a partially constructed 3D model of the object. One example of a system and method for scanning three-dimensional objects is described in U.S. patent application Ser. No. 15/630,715, filed in the United States Patent and Trademark Office on Jun. 22, 2017, the entire disclosure of which is incorporated herein by reference.

In some embodiments of the present invention, the construction of the depth image or 3D model is performed locally by the scanner itself. It other embodiments, the processing is performed by one or more local or remote servers, which may receive data from the scanner over a wired or wireless connection (e.g., an Ethernet network connection, a USB connection, a cellular data connection, a local wireless network connection, and a Bluetooth connection).

As a more specific example, the scanner may be a hand-held 3D scanner. Such hand-held 3D scanners may include a depth camera (a camera that computes the distance of the surface elements imaged by each pixel) together with software that can register multiple depth images of the same surface to create a 3D representation of a possibly large surface or of a complete object. Users of hand-held 3D scanners need to move it to different positions around the object and orient it so that all points in the object's surface are covered (e.g., the surfaces are seen in at least one depth image taken by the scanner). In addition, it is important that each surface patch receive a high enough density of depth measurements (where each pixel of the depth camera provides one such depth measurement). The density of depth measurements depends on the distance from which the surface patch has been viewed by a camera, as well as on the angle or slant of the surface with respect to the viewing direction or optical axis of the depth camera.

Figure 2:
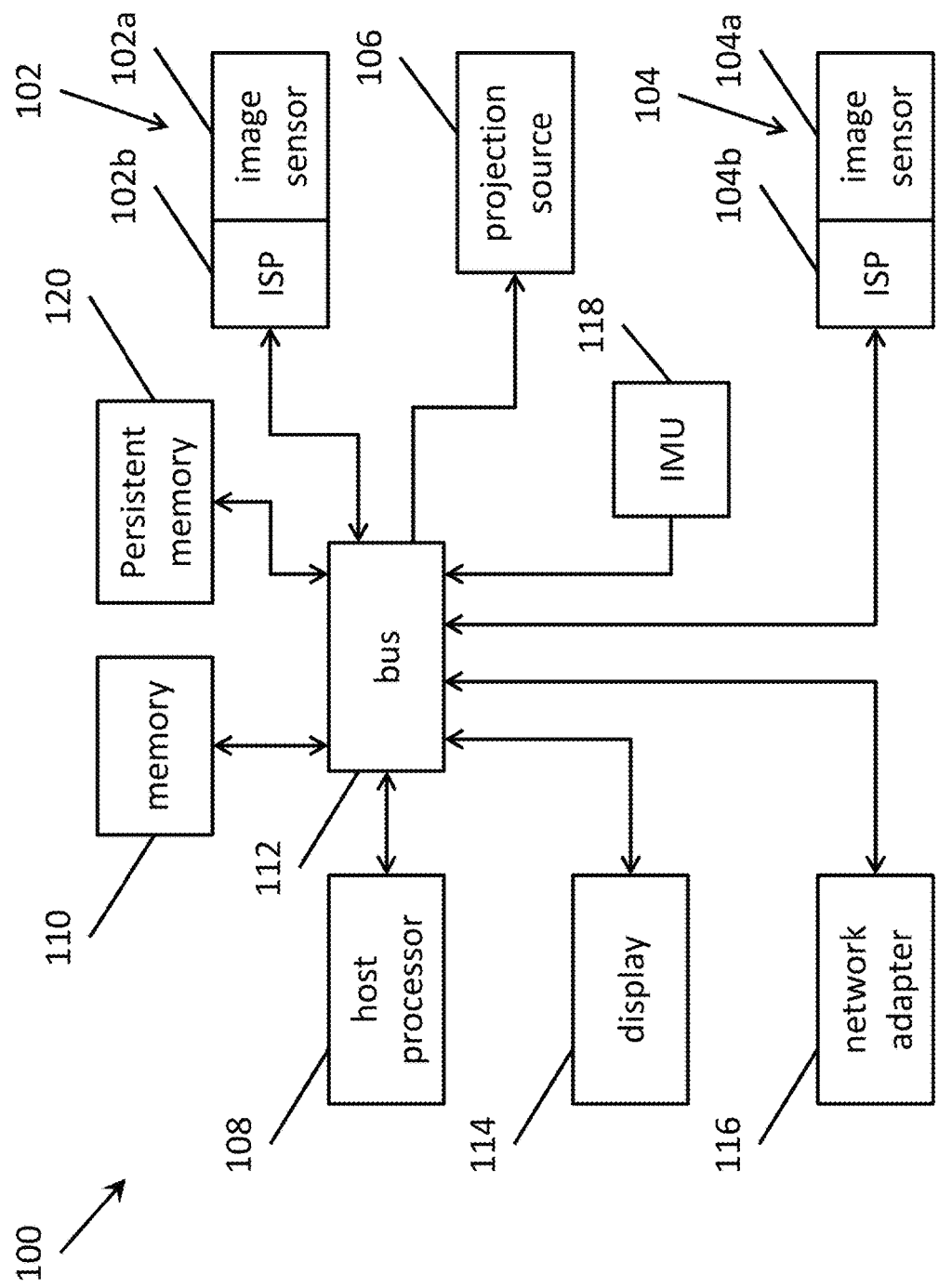
FIG. 2 is a block diagram of a scanner system according to one embodiment of the present invention.

FIG. 2 is a block diagram of a scanning system as a stereo depth camera system according to one embodiment of the present invention.

The scanning system 100 shown in FIG. 2 includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The scanning system 100 may include additional components such as a display 114 to allow the device to display images, a network adapter 116 to communicate with other devices, an inertial measurement unit (IMU) 118 such as a gyroscope to detect acceleration of the scanning system 100 (e.g., detecting the direction of gravity to determine orientation and detecting movements to detect position changes), and persistent memory 120 such as NAND flash memory for storing data collected and processed by the scanning system 100. The IMU 118 may be of the type commonly found in many modern smartphones. The image capture system may also include other communication components, such as a universal serial bus (USB) interface controller.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors. In some embodiments of the present invention, the system includes one or more visible light cameras (e.g., RGB cameras) and, separately, one or more invisible light cameras (e.g., infrared cameras, where an IR band-pass filter is located across all over the pixels). In other embodiments of the present invention, the image sensors 102a and 104a are infrared (IR) light sensors.

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. All three cameras may be optically registered (e.g., calibrated) with respect to one another. One example of a depth camera system including three cameras is described in U.S. patent application Ser. No. 15/147,879 "Depth Perceptive Trinocular Camera System" filed in the United States Patent and Trademark Office on May 5, 2016, the entire disclosure of which is incorporated by reference herein.

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3D point in the scene projects onto the same scanline index in the master and in the slave image. Let $u_m$ and $u_s$ be the coordinates on the scanline of the image of the same 3D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s - u_m$ is called disparity and denoted by d; it is inversely proportional to the orthogonal distance of the 3D point with respect to the rectified cameras (that is, the length of the orthogonal projection of the point onto the optical axis of either camera).

Stereoscopic algorithms exploit this property of the disparity. These algorithms achieve 3D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3D details such as the one described in U.S. Pat. No. 9,392,262 "System and Method for 3D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. In some embodiments, the projection source 106 may include multiple separate illuminators, each having an optical axis spaced apart from the optical axis (or axes) of the other illuminator (or illuminators), and spaced apart from the optical axes of the cameras 102 and 104.

An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

In some circumstances, the depth camera system includes two components: a detachable scanning component and a display component. In some embodiments, the display component is a computer system, such as a smartphone, a tablet, a personal digital assistant, or other similar systems. Scanning systems using separable scanning and display components are described in more detail in, for example, U.S. patent application Ser. No. 15/382,210 "3D Scanning Apparatus Including Scanning Sensor Detachable from Screen" filed in the United States Patent and Trademark Office on Dec. 16, 2016, the entire disclosure of which is incorporated by reference.

Although embodiments of the present invention are described herein with respect to stereo depth camera systems, embodiments of the present invention are not limited thereto and may also be used with other depth camera systems such as structured light time of flight cameras and LIDAR cameras.

Depending on the choice of camera, different techniques may be used to generate the 3D model. For example, Dense Tracking and Mapping in Real Time (DTAM) uses color cues for scanning and Simultaneous Localization and Mapping uses depth data (or a combination of depth and color data) to generate the 3D model.

Figure 3:
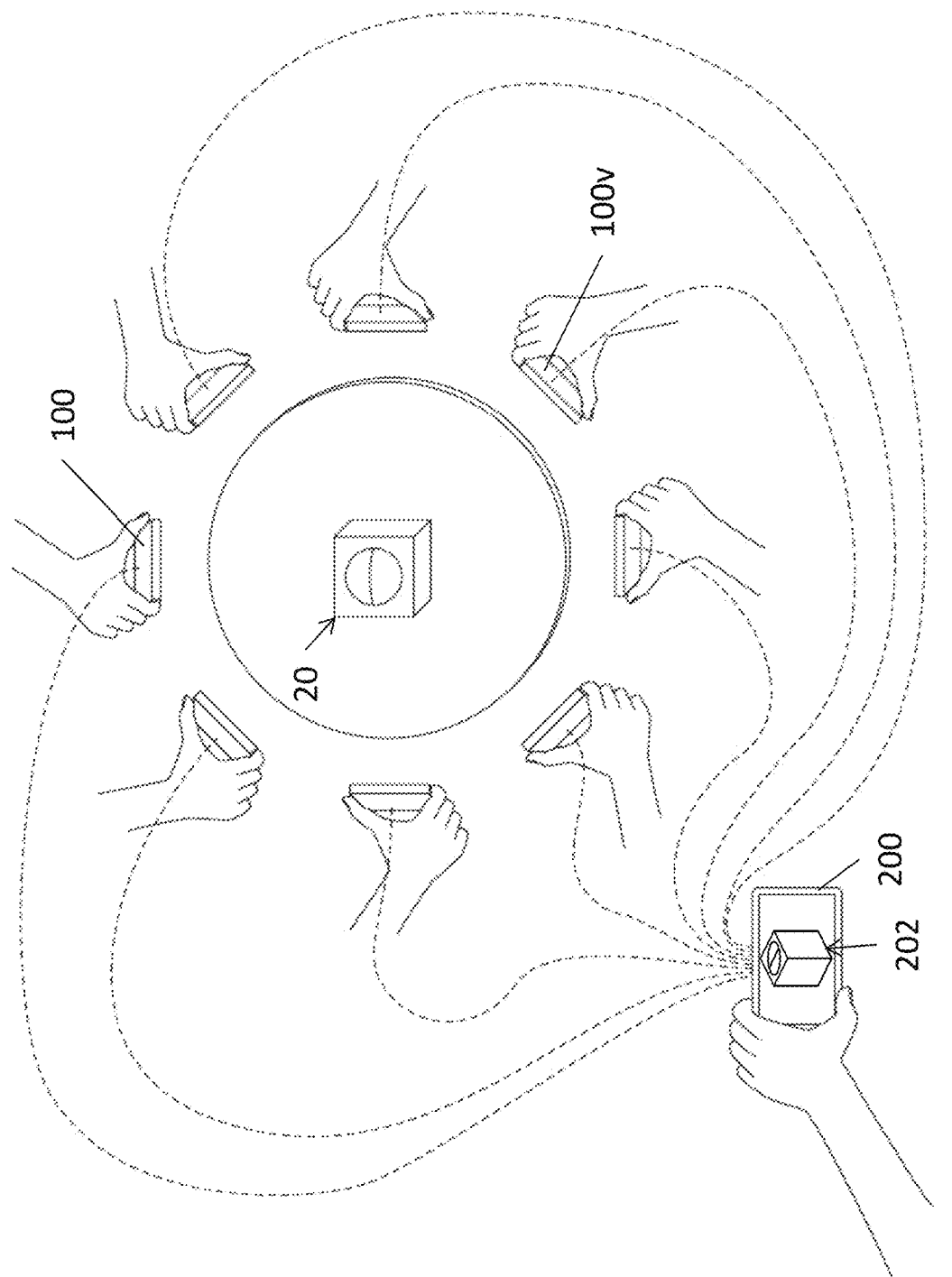
FIG. 3 illustrates, from the perspective of a user, a system and method for scanning an object using a 3D scanning system including a camera separate from a screen according to one embodiment of the present invention.

FIG. 3 illustrates, from the perspective of a user, a system and method for scanning an object 20 in a fixed location using a 3D scanning system 50 including a scanning sensor (or camera) separate from a screen according to one embodiment of the present invention. In particular, FIG. 3 illustrates a single scanning sensor module 100 at eight different physical positions around the object 20 at eight different points in time. The dotted line between the scanning sensor module 100 and the scanning device 200 indicates the data connection between the two pieces of hardware, where the scanning device 200 may transmit commands to the scanning sensor module 100 over the data connection, and the scanning sensor module 100 may transmit data, including images, to the scanning device 200.

As seen in FIG. 3, the user 22 may hold the scanning sensor module 100 (e.g., the camera) in one hand (depicted in FIG. 3 as the right hand) and may hold the scanning device 200 (e.g., a smartphone, tablet computer, personal digital assistant, or other handheld device with a display) in the other hand (depicted in FIG. 3 as the left hand). As shown in FIG. 3, the user may move the scanning sensor from the front of the object to the back of the object without changing the position of the scanning device 200. While the user scans the object 20 (as shown in FIG. 3, a tissue box) with the scanning sensor, the scanning device 200 displays a view 202 (e.g., a real time view) or representation of the images captured by the scanning sensor module. As depicted in FIG. 3, the user may have a more top-down view of the object 20, but the user 22 may position the scanning sensor module 100 to have a side view of the object 20. The view 202 on the scanning device 200 shown in FIG. 3 corresponds to the side view image captured by the scanning sensor module 100 at position 100v. This may enable the user 22 to scan the object 20 more easily and comfortably by manipulating the position of the scanning sensor module 100 without having to contort his or her body to maintain sight of the view 202 on the display of the scanning device 200. Therefore, the user receives real time feedback regarding the data being captured by the scanning sensor, thereby helping to ensure that all sides of the object, including the top, are imaged by the scanning sensor.

Without this feedback, a user may inadvertently orient the scanning sensor in a direction that fails to capture useful images of the object. For example, the user may inadvertently capture images of the ceiling or the floor, or may capture images of the background. In addition, in a comparative imaging system in which the camera and the display are rigidly fixed to one another, the fixed relationship between the field of view of the camera and the viewing direction of the display of the imaging system can make it difficult for the user to maintain a view of the screen while scanning all sides of the object.

Once the three-dimensional geometry of the scanned object has been acquired and processed by the scanning system, it is possible to perform some refinement to obtain a clean three-dimensional model. The three-dimensional model may also be associated with texture information (e.g., color information). Such a model may be represented as a mesh. Creating a textured model is more complex than creating an untextured model, in part because a viewer of the textured model may have higher expectations for photorealism and due to the additional challenge of aligning the textures with the surface of the mesh. Various techniques based on photometric error minimization and graph cut optimization may be applied in the creation of textured models, and, in some embodiments, such techniques may be performed by a server, rather than the scanner itself.

Figure 4B:
FIGS. 4A and 4B are examples of three-dimensional models captured by a scanning system.
Figure 4A:
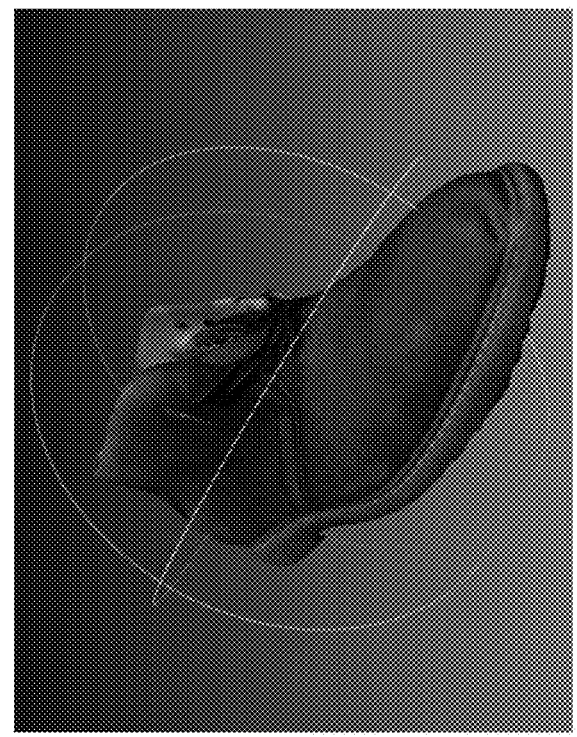

FIGS. 4A and 4B are examples of three-dimensional models captured by a scanning system. FIG. 4A is a textured model of a brown shoe and may have been captured by an RGB-IR depth camera system. FIG. 4B is an untextured model of a duffel bag and may have been captured without texture (e.g., by a depth camera system that includes only IR sensors and no visible light or RGB sensors). The generated models may be stored in a standard format such as a "ply" format or "obj" format and can be displayed on a display device using viewer software. In some cases, the viewing software may be web based (e.g., executed by a web browser), such as the case with the ThreeJS viewer.

Storage of Three-Dimensional Models

According to one aspect of embodiments of the present invention, a collection of existing media documents, such as three-dimensional (3D) models, is stored in a database. When generating metadata for a supplied media document (such as a 3D model), the database is queried for media documents that are similar to the supplied media document, and similar entries are returned as a result.

Database Organization

According to one aspect of embodiments of the present invention, a database stores N entries (N media documents) that are organized into K different classes. The number of entries (N) may be in the order of millions and the number of classes (K) may be in the order of thousands or tens of thousands. The K classes may be organized in a hierarchical tree-like structure, a portion of which is shown in Table 1:

TABLE 1

➢ Alcohol
➢ Antiques
➢ Art
ᐯ Baby
  ᐯ Baby Carriers
    ᐯ Baby Carriers Slings
    ➢ Tapestries TABLE 1-continued ➢ Backpacks
➢ Baby Clothing
➢ Baby Shoes
ᐯ Bathing
  ➢ Grooming
  ➢ Bath Tubs
  ➢ Bathing Accessories
  ➢ Health
  ➢ Other Bathing
  ➢ Skincare
  ᐯ Towels
    ➢ Washcloths
➢ Bedding
➢ Car Seats According to one embodiment, each entry in the database is associated with metadata that includes a name, one or more classes, one or more tags, a textual description, and visual information.

The name field is a specific name for the media document of the entry. For example, when the media document is a 3D model of a particular type of car may specify the full name of the car (e.g., model year, make, model, and trim concatenated into a string).

The classes field identifies one or more classes of the K classes that are associated with the particular entry. In particular, if the K classes are organized hierarchically into a tree like structure, then, if an entry belongs to a class, it also belongs to all of the classes that are above the particular class in the tree, up to the root of the tree. For example, an entry with the class "Washcloths" as shown in Table 1 would also belong to the class of its immediate parent, "Towels," as well as the higher level classes of "Bathing" and "Baby."

The one or more tags correspond to keywords (e.g., non-hierarchical words or phrases) that are associated with the particular entry. These may include, for example, descriptions of the colors of the product (e.g., red, white, and yellow), patterns (e.g., plaid, striped, and gingham), materials (e.g., cotton, polyester, blends), sizes, or other descriptors that may not fit into a hierarchy such as the classes.

The textual description field may describe the model in narrative form, and may be written for human readability, but may also be used in a textual search for entries.

The media information field may correspond to the media document itself (or more broadly, the particular digital media document associated with the entry, such as a particular image, a particular 3D model, a particular audio recording, or a particular video).

According to some embodiments, some of these metadata fields, such as the name, the classes, and the visual information, are mandatory, while other metadata fields, such as the tags and the textual description are optional. Some or all of the metadata fields for any given entry may be entered manually by a user, or may be generated automatically, as described in more detail below.

Database Search for Automatic Metadata Population

One aspect of embodiments of the present invention is directed to performing searches of the database described above for entries that are similar to a given input media document in order to generate metadata for the given input media document.

In the context of this disclosure, the following nomenclature for queries and entries is considered: an entry is (or is associated with) a media document (e.g., a 3D model, an image, an audio recording, or a video) that is already present in the database and for which metadata are available, while a query is a media document (e.g., a three-dimensional model) that is not present in the database, and for which some or all of the metadata fields are desired to be filled by combining information from the metadata of the entries or models already present in the database. The case where the metadata field to be populated is the class of the query may be referred to as classification of the media document of the query.

Techniques for querying a database of images generally fall within two different forms: image classification (assigning one or more classes to an image); and image retrieval (identifying the most similar image entry in the database with respect to the query image). One common image database is ImageNet (see, e.g., J. Deng, W. Dong, R. Socher, L.-J. Li, K. Li and L. Fei-Fei, ImageNet: A Large-Scale Hierarchical Image Database. *IEEE Computer Vision and Pattern Recognition* (*CVPR*), 2009), which includes millions of images and thousands of different classes. Methodologies for performing image classification and retrieval include techniques using Convolutional Neural Networks (CNNs) (see, e.g., A. Krizhevsky, I. Sutskever, G. E. Hinton, "Imagenet classification with deep convolutional neural networks", Advances in Neural Information Processing Systems, 2012., Y. LeCun, B. Boser, J. S. Denker, D. Henderson, R. E. Howard, W. Hubbard, L. D. Jackel, "Backpropagation applied to handwritten zip code recognition", Neural Computation, 1989., and C. Szegedy, W. Liu, Y. Jia, P. Sermanet, S. Reed, D. Anguelov, D. Erhan, V. Vanhoucke, A. Rabinovich, "Going deeper with convolutions", CVPR, 2015) and Bayesian hierarchical models (see, e.g., L. Fei-Fei, P. Perona, "A Bayesian hierarchical model for learning natural scene categories", CVPR, 2005).

In addition, audio recordings, and the audio components of videos, can also be supplied to a convolutional neural network for feature extraction by converting the audio recording into an image by creating one or more spectrograms of the audio (e.g., one spectrogram for each channel of the audio).

For the sake of convenience, and without limitation thereto, a CNN can be regarded as a system that, given an input image, performs a set of operations such as two-dimensional (2D) convolutions, non-linear mapping, max-pooling aggregations, and connections to compute a vector of values or features (commonly referred to as a feature vector). In particular, the estimated feature vector for a query image is a vector of values (generally encoded as floating-point or fixed-point numeric values) of large dimensionality (e.g., 4096 values). The feature vector can be considered as the "signature" of the input image, and it has the property that feature vectors of objects in the same class are points close in the feature vector space (e.g., have similar feature vectors). The feature vector can then be used by a classifier (e.g., a SoftMax classifier) in order to obtain an estimate of one or more classes of metadata for the input image. As such, the classifications computed by the classifier can be used to identify which classes are associated with a given image.

In addition to supplying the feature vector to the classifier to compute classifications, the feature vector can also be used for image retrieval. Because similar images have similar feature vectors, entries in the database are similar to the query image if their feature vectors are close to the feature vector of the query image in feature vector space, where the "closeness" or similarity can be computed with respect to a standard metric such as a $L^1$ or $L^2$ metric. Given the large dimensionality of feature vector space, the feature vectors may be made more computationally tractable by applying a technique for dimensionality reduction, such as Principal Component Analysis (PCA) or Linear Discriminant Analysis (LDA).

In a manner similar to two dimensional images, three-dimensional models, whether textured or untextured, can also be considered in the context of classification or retrieval using a convolutional neural network and a classifier.

As such, one aspect of embodiments of the present invention relates to using information from the media document of the query to search for entries associated with similar media documents in order to obtain metadata. In particular, one aspect of embodiments of the present invention relates to encoding a media document in order to extract a feature vector from the media document using a convolutional neural network. The extracted feature vector can then be supplied to a classifier to classify the media document or may also be used to search for similar media documents in feature vector space.

Figure 5:
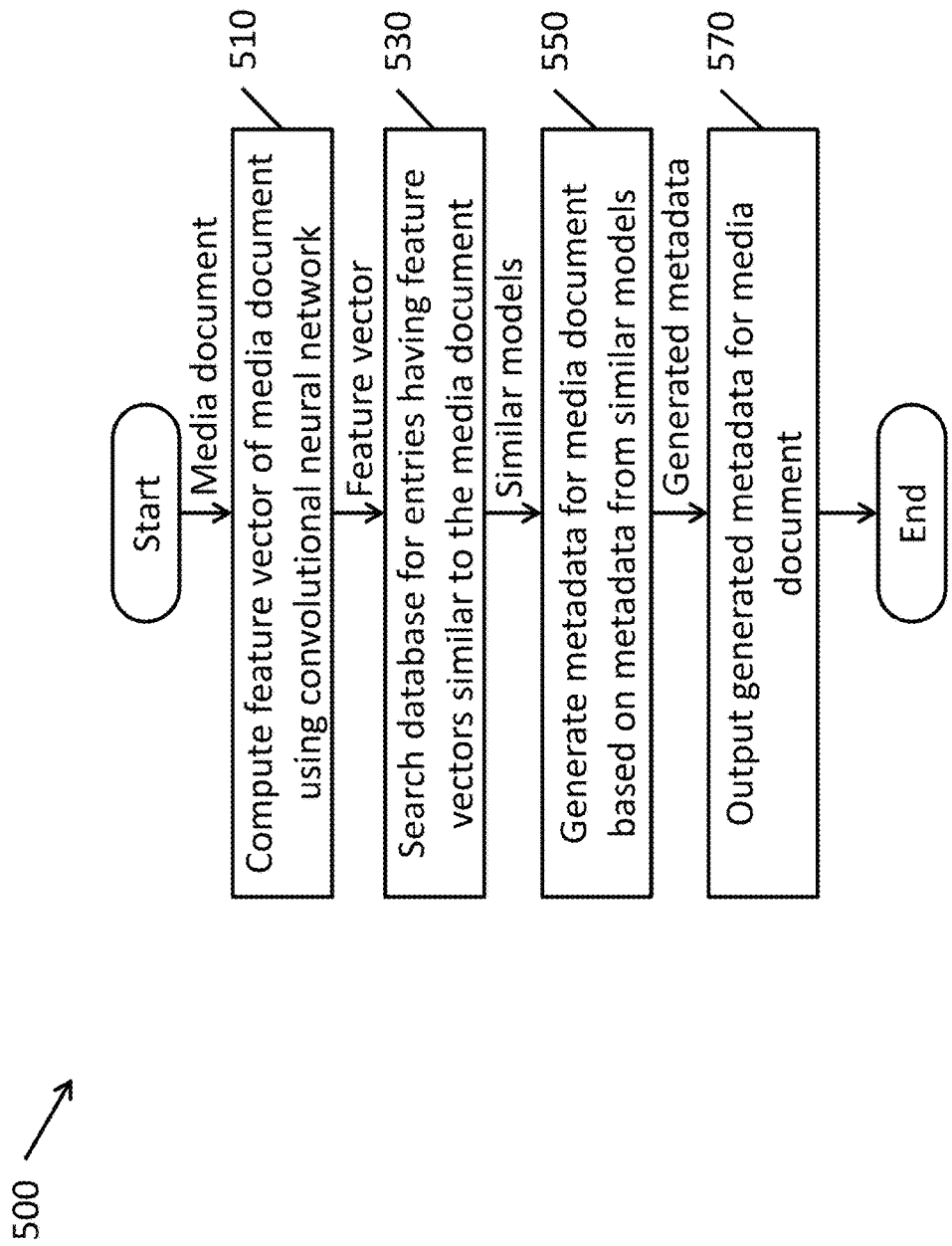
FIG. 5 is a flowchart of a method for generating metadata for a media document according to one embodiment of the present invention.

FIG. 5 is a flowchart of a method 500 for generating metadata for a media document according to one embodiment of the present invention. The method shown in FIG. 5 may be performed by the host processor 108 of the scanner 100, performed by a server (e.g., a computer local to the scanner 100 or a computer in a data center on the "cloud"), or combinations thereof (where some operations may be performed by the host processor 108 of the scanner and other operations are performed by a server). For the sake of convenience, the operations will be described as being performed by a "processor," without limitation as to whether the processor is the host processor 108 or a processor of a server.

In operation 510, the processor computes a feature vector of a media document that it has received. In some instances, the media document may be a 3D model that was captured by the scanner 100 during a scanning process. In other instances, the media document may be retrieved from a 3rd party (e.g., a 3D model captured by a different scanning device), may be generated manually using a computer aided design tool, or may be a scanned model that is modified using a computer aided design tool.

As noted above, in the case where the media document of the query is a 2D image and the media documents of the database are also 2D images, the 2D image may be supplied directly to a trained CNN (e.g., trained on 2D images). In the case where the media document is an audio recording or where the media document is a video recording that includes an audio component, the processor converts the audio into one or more spectrograms and supplies the one or more spectrograms as input to the trained CNN (e.g., trained on spectrograms of audio recordings).

Figure 6A:
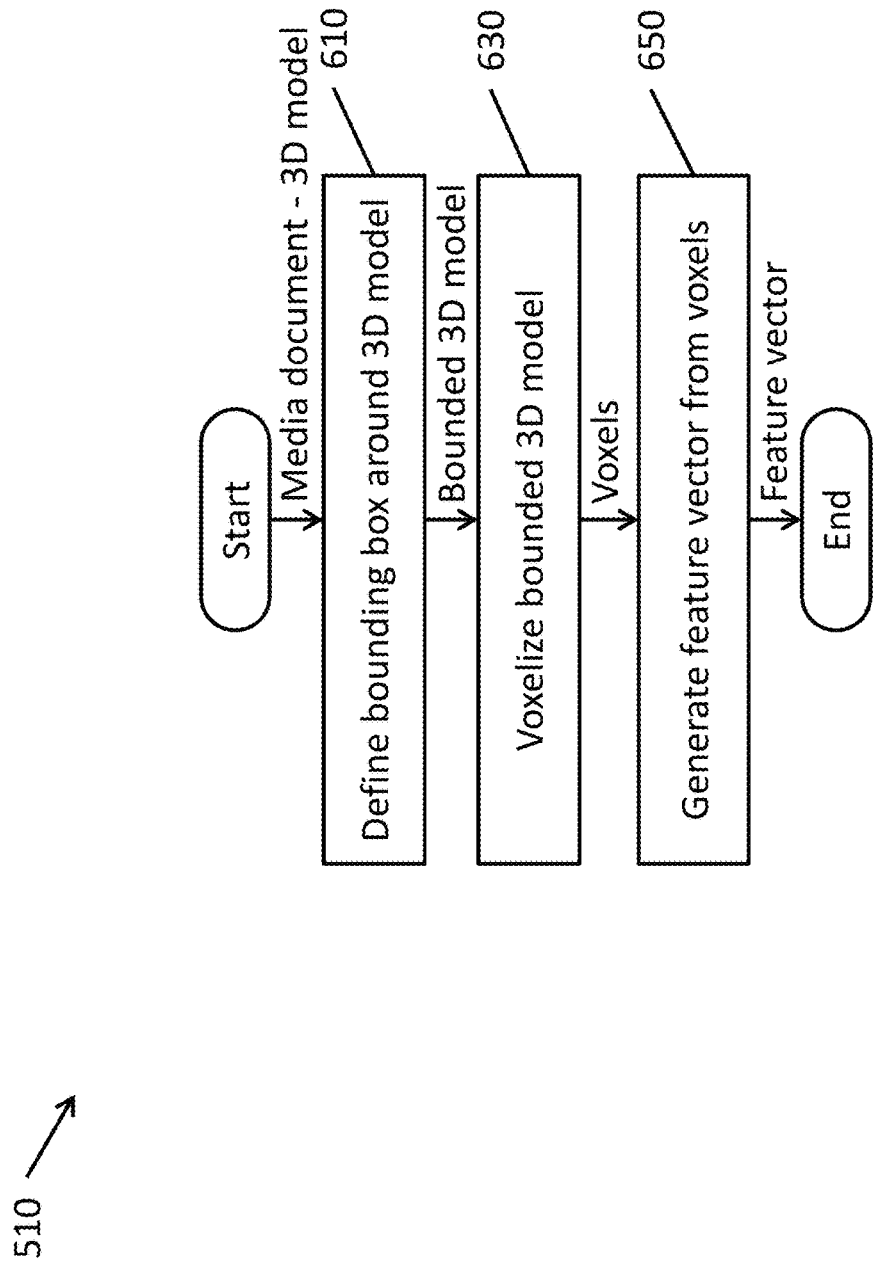
FIG. 6A is a flowchart illustrating a method for computing a feature vector in the case where the media document is a 3D model by voxelizing the 3D model according to one embodiment of the present invention, and FIG. 6B visually depicts the application of a CNN to a 3D model using voxelization.
Figure 6B:
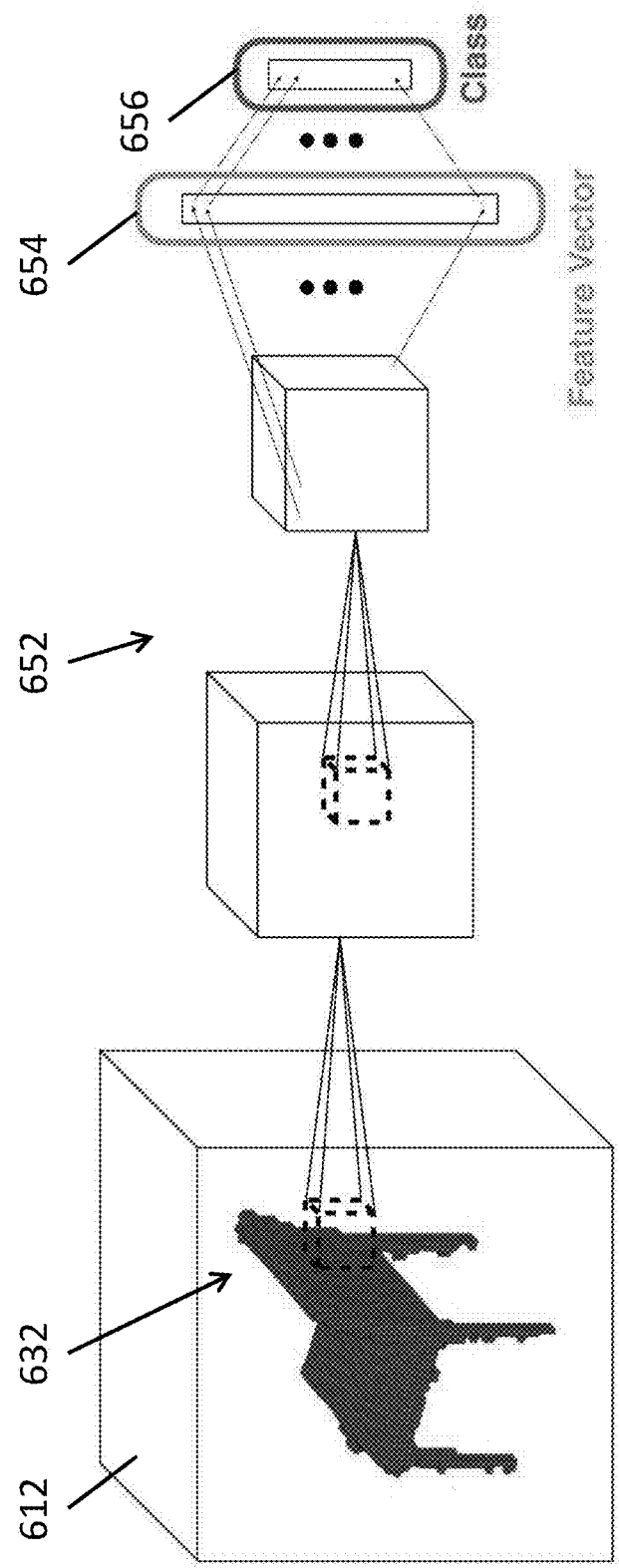

In the case where the media document of the query is a 3D model and the database stores a collection of 2D images, one or more feature vectors can be extracted from the 3D model. For example, in one embodiment, the 3D model is rendered from multiple viewpoints to generate a plurality of 2D images, and each of the 2D images may be supplied to a trained CNN to generate a plurality of feature vectors (extracted from 2D views) associated with the 3D model. As such, the 3D model can be used to query a database of 2D images. FIG. 6A is a flowchart illustrating a method for computing a feature vector in the case where the media document is a 3D model by voxelizing the 3D model according to one embodiment of the present invention, and FIG. 6B visually depicts the application of a CNN to a 3D model using voxelization. Referring to FIGS. 6A and 6B, in operation 610, the processor defines a bounding box 612 around the 3D model, such as by applying the rotating calipers algorithm to the 3D model.

In operation 630, the processor voxelizes the model to generate a set of voxels representing the 3D model. In one embodiment, in the voxelization process, the processor divides the bounding box into subunits, referred to as voxels. For example, the bounding box may be a cube with 256 voxels on a side for a total of $256^3=16,777,216$ voxels, although embodiments of the present invention are not limited thereto, and may be substantially larger. Each voxel may be associated with a value representing whether or not some portion of the 3D model is contained within the voxel (e.g., in a binary valued voxelization), or in another case, each voxel may be associated with a value (e.g., an 8-bit value) representing the fraction or percentage of the voxel that is occupied by the 3D model (e.g., an integer valued or floating point voxelization). FIG. 6B depicts a voxelized 3D model 632.

According to one embodiment of the present invention, operation 630 further includes estimating features or performing principal component analysis to identify a "preferred view" before performing the voxelization. Identifying a consistent preferred view of the model before voxelization increases the likelihood that two different 3D models of substantially similar objects (or the same objects) will be voxelized from the same perspective (e.g., with the voxels defined along substantially the same coordinate space), thereby providing rotational invariance (e.g., the ability of the system to recognize models of objects that have been rotated).

In operation 650, the processor generates a feature vector from the voxels generated in operation 630. According to one embodiment of the present invention, the feature vector is 654 is computed by supplying the voxels to a trained convolutional neural network 652. Because the voxel representation can be regarded as a 3D tensor, the voxels can be directly supplied as input to a CNN, where the CNN is trained based on voxelized 3D models. The dashed cubes shown in FIG. 6B represent convolution operations. As shown in FIG. 6B, the feature vector 654 can also be supplied to a classifier to generate classifications 656 of the voxelized 3D model 612.

Figure 7A:
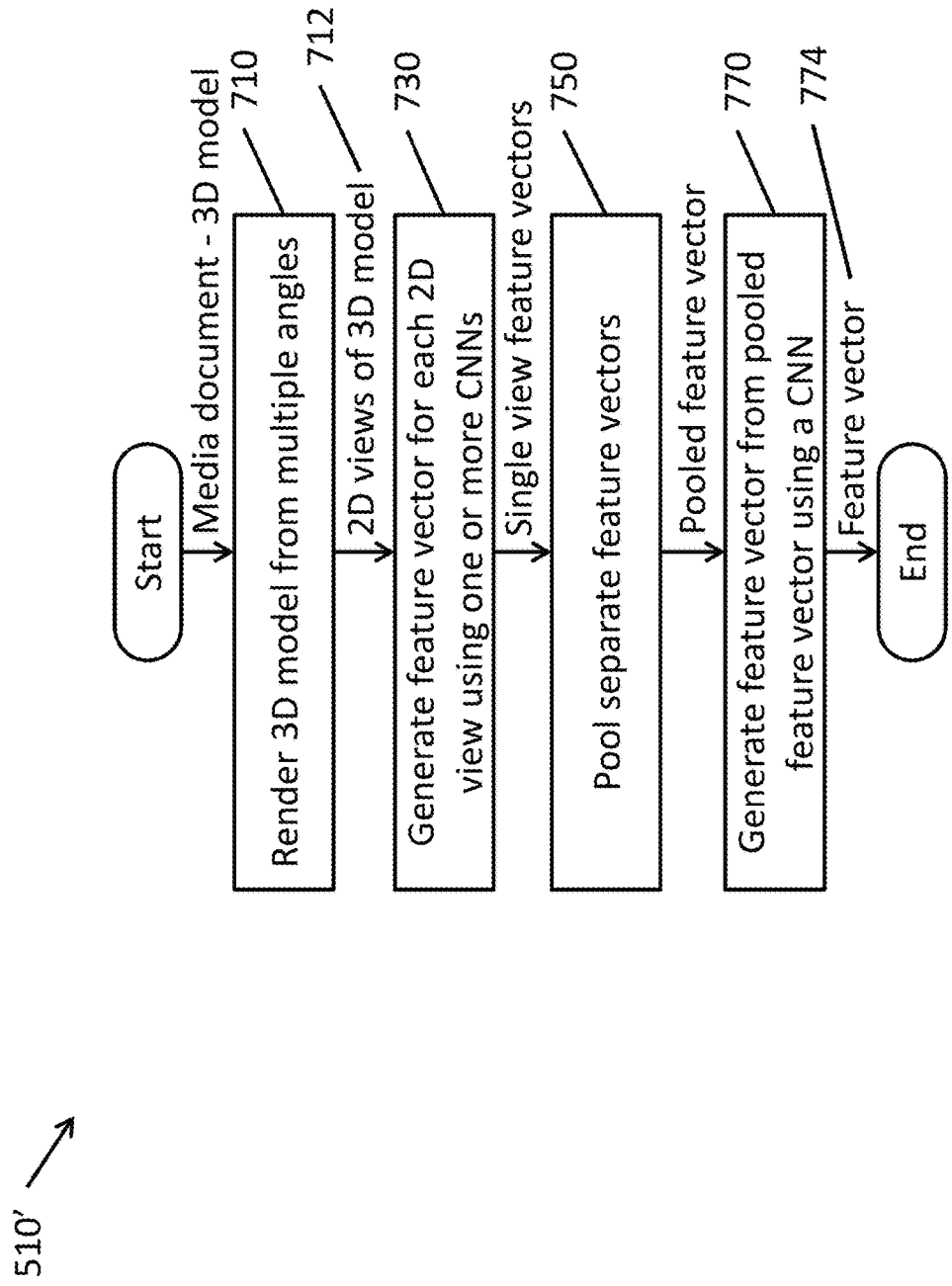
FIG. 7A is a flowchart illustrating a method for computing a feature vector in the case where the media document is a 3D model by rendering multiple views of a 3D model from different viewpoints or directions according to one embodiment of the present invention, and FIG. 7B visually depicts the application of a CNN to a 3D model rendered from multiple views.

According to another embodiment of the present invention, the geometrical and textural information about the 3D model is encoded by rendering the model from multiple directions or viewpoints. FIG. 7A is a flowchart illustrating a method for computing a feature vector in the case where the media document is a 3D model by rendering multiple views of a 3D model from different viewpoints or directions according to one embodiment of the present invention, and FIG. 7B visually depicts the application of a CNN to a 3D model rendered from multiple views.

Figure 7B:
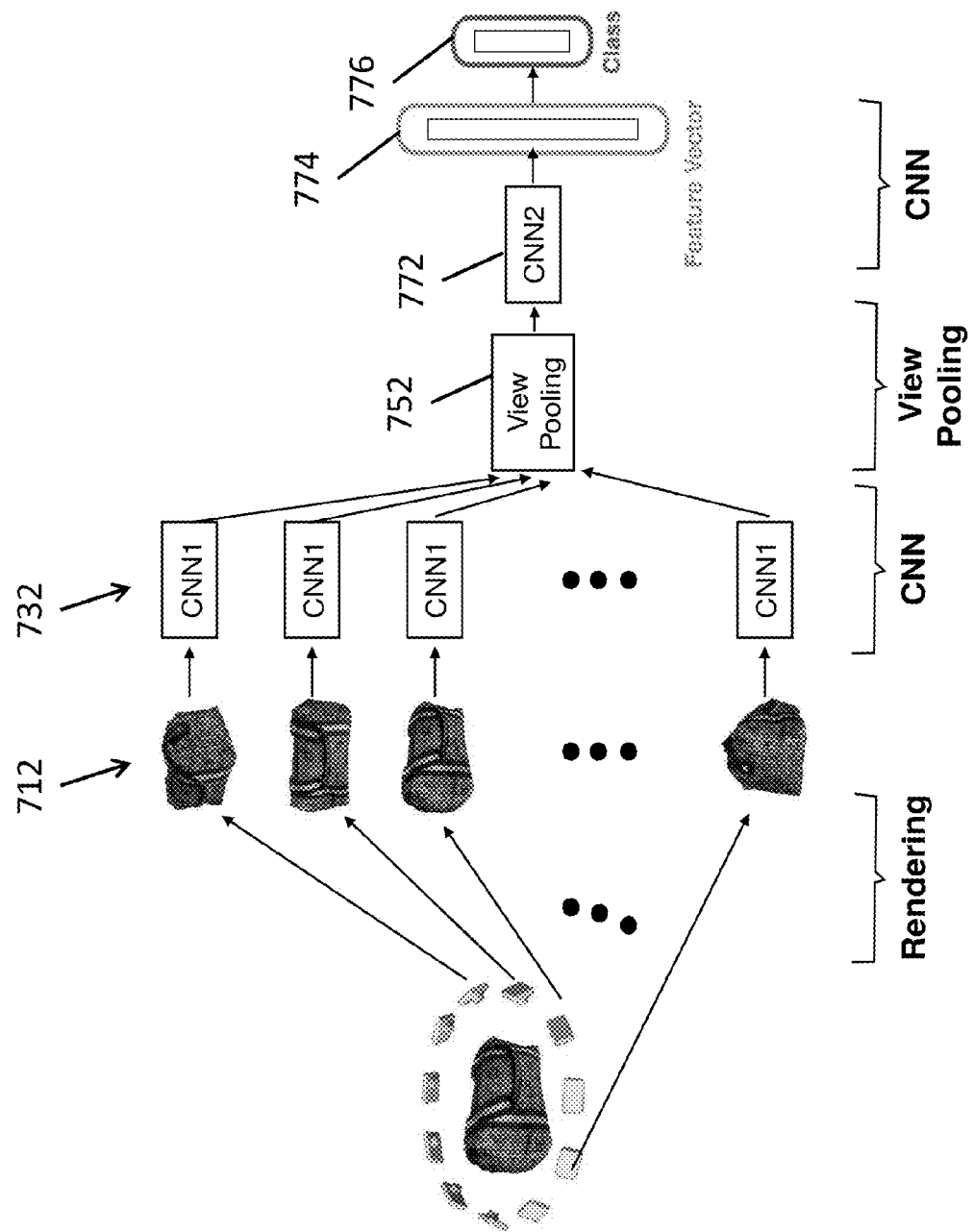

Referring to FIGS. 7A and 7B, in operation 710 the processor renders the 3D model from multiple angles to generate multiple two-dimensional (2D) views 712 of the 3D model. A similar feature estimation or principal component analysis technique may also be applied to identify "preferred views" of the 3D model from which to generate the multiple 2D views of the 3D model. In operation 730, the processor supplies each of the 2D views to a convolutional neural network 732 to generate a plurality of corresponding single view feature vectors (feature vectors corresponding to single ones of the 2D views). In some embodiments, as shown in FIG. 7B, there is a separate convolutional neural network for each view. In other embodiments, each of the views is supplied to the same convolutional neural network. In operation 750, a view pooling layer 752 aggregates the single view feature vectors computed from the individual 2D views or images. The view pooling layer 752 allows additional flexibility in the system, because the view pooling layer 752 makes the length of the pooled feature vector independent of the number of views of the 3D model.

In operation 770, the processor applies a final stage CNN 772 to compute a feature vector 774. The feature vector 774 may also be supplied to a classifier to generate classifications 776 of the views of the 3D model.

In the case where the media document of the query includes one or more 2D images of the same object and the database is a collection of 3D models, one or more feature vectors may be extracted from the 2D images to generate feature vectors that can be compared with feature vectors of the collection of 3D models. In one embodiment of the present invention, the 2D images are used to synthesize a 3D model using, for example, stereoscopic algorithms such as block matching, which are described briefly above, and also described in more detail in R. Szeliski. "Computer Vision: Algorithms and Applications", Springer, 2010. A feature vector can then be extracted from the synthesized 3D model in a manner substantially similar to those in which the media document of the query is a 3D model, such as the techniques described above with respect to FIGS. 6A, 6B, 7A, and 7B.

In operation 530, the processor searches for media documents in the database having feature vectors similar to the feature vector computed for the input media document. As noted above, the "closeness" or similarity of the feature vectors can be computed with respect to a multi-dimensional distance metric such as a p-norm in $L^p$ space (e.g., for two vectors $x_1$ and $x_2$, $x=(x_1, x_2)$, $\|x\|_p=(\Sigma_{i=1}^n |x_i|^p)^{1/p}$). For example, $L^1$ corresponds to a distance in "taxicab" space or "Manhattan space," and $L^2$ corresponds to a distance in Euclidian space. In some embodiments, the processor determines that two feature vectors (e.g., the feature vector of the query model and the feature vector of a model of one of the entries in the database) are similar when the metric representing the distance (or difference) between the two is less than a threshold value.

In one embodiment of the present invention, similar media documents are identified in the database by comparing the feature vector of the media document of the query with the feature vector of every entry in the database. According to another embodiment of the present invention, similar entries are grouped together (or binned) in the database based on similarity of their feature vectors. An initial search may identify one or more bins of entries that are similar to the media document of the query, where all of the entries each of the identified bins of entries may be considered to be similar to the feature vector of the media document of the query. The search may be further refined by comparing the feature vector of the media document of the query with each feature vector of each entry in each of the identified bins.

In one embodiment of the present invention, where the media document of the query is a 3D model and the database of entries contains a collection of 3D models, the similar 3D models are identified in the database by applying an iterative closest point (ICP) technique. Generally, iterative closest point attempts to align two point clouds (e.g., corresponding to 3D models). One byproduct of an ICP technique is a map of distances between the points of one point cloud and the points of the other point cloud. As such, in one embodiment, a similarity metric corresponds to a statistic of these distances, such as the mean distance between points of the point clouds.

In one embodiment case where the media document of the query includes one or more 2D images of the same object and the database is a collection of 3D models, the feature vectors extracted in operation 510 may be separate feature vectors for each of the one or more 2D images, and plurality of feature vectors can be generated for each of the 3D models in the database by rendering each of the 3D models from a plurality of different viewpoints, and supplying each of the separate rendered views of the 3D model to a convolutional neural network to generate one or more feature vectors, each corresponding to a different viewpoint. The feature vectors extracted from the 2D images of the query may then be compared (e.g., using the $L^1$ or $L^2$ metrics described above) with the feature vectors of the 2D views of the 3D model to calculate a similarity between the 2D images of the query and the 3D model.

The set of retrieved entries of the query results can also be displayed to the user and manually refined by the user in order to lead to a more relevant set of retrieved objects that can be used for inferring the metadata.

According to one aspect of embodiments of the present invention, in the case where the query includes partially filled metadata, searching the database for similar entries in operation 530 may also include searching for entries that contain metadata similar to the partially filled fields of the metadata of the query. The metadata of the similar entries can then be used to generate the metadata for the unfilled portions of the metadata of the query.

For example, a query may include the metadata <title="black BMW m3 2016", class="car", tags=" ", text=" ">. In such a query, the "title" and "class" entries are filled, and the "tags" and "text" entries are unfilled. The unfilled entries of "tags" and "text," as well as potentially a more specific class, can be automatically generated by searching the database for similar entries, based on the available fields of "title" and "class." In particular, the database may be searched for entries in the class "car" that have a title that is similar to the title of in the metadata of the query. The title of an entry of the database may be considered to be sufficiently similar if, for example, the title of the entry contains at least 75% of the words in the title of the query. As another example, a Levenshtein distance or other distance metric (e.g., edit distance metric) may be used to compare the titles, where an entry having a distance below a threshold distance may be considered to be similar.

In operation 550, the tags and text metadata fields of the identified similar entries are then evaluated and their content is merged in order to automatically generate the tags and text fields to populate the unfilled fields of the metadata of the query. In one embodiment, the tags can be obtained by enumerating all the tags in the retrieved entries and keeping only the tags which appear at least two times and the text can be obtained by semantic text analysis techniques. In one embodiment, the class field of the generated metadata is filled using the classifications (e.g., classifications 656 or classifications 776 shown in FIGS. 6B and 7B, respectively) computed for the feature vector by a classifier.

For example, referring back to FIG. 1, the retrieved entries 12 and their corresponding class and tags metadata are shown below in Table 2:

TABLE 2

| Retrieved entry | Class | Tags |
|---|---|---|
| 1 | car | Jeep, blue, sport |
| 2 | car | Jeep, convertible, red |

TABLE 2-continued

| Retrieved entry | Class | Tags |
|---|---|---|
| 3 | cap | black & white |
| 4 | car | convertible, sport |

According to some embodiments of the present invention, a rule is applied where tags that appear at least a threshold number of times are added to the generated metadata. As seen in Table 2, the tags "Jeep," "convertible," and "sport" all appear twice in the tags of the results, so, assuming that the threshold is two, these three tags are added to the tags of the generated metadata. The tags "blue," "red," and "black & white" each appear only once in the results, and therefore these are not added to the tags of the generated metadata. While the tag "black & white" does accurately reflect the colors of the 3D model of the query, not enough of the results include this tag for it to be included in the generated metadata.

While examples are described herein where the metadata that appears at least twice in the results of the search are added to the generated metadata, embodiments of the present invention are not limited thereto. For example, the processor may be configured to retrieve a large number of results (e.g., the ten most similar entries), and the threshold for adding a class or tag that appears in the results may be at least 4 results. In other embodiments, the threshold for adding a class or tag may be set as a minimum percentage of the results that include the tag or class, such as at least 50%.

According to some embodiments of the present invention, the class field of the generated metadata may also be filled using classes that appear at least twice in the query results or based on a class that appears in the majority of the query results. As shown in Table 2, the class "car" appears in three of the results and the class "cap" appears in one of the results. As such, the generated metadata includes the class "car" but not the class "cap."

According to some embodiments of the present invention, rather than using the classes of the query results to assign a class to the media document, the feature vector of the media document of the query is supplied to a classifier (e.g., a classifier trained on entries within the database) to generate a classification or classifications (e.g., classifications 656 or classifications 776). The classifications may be represented as a plurality of values, where each value represents a confidence that the media document belongs to a particular class. For example, a classification of the query shown in FIG. 1 may express high confidence that the query depicts a car, low confidence that the query depicts a cap, and substantially zero confidence that the query depicts a dog.

In operation 570, the processor outputs the generated metadata for the media document. This may include, for example, displaying the metadata on a display device in association with the media document. The user may then review the automatically generated metadata, validate that the generated metadata is sensible for the result (e.g., that the class, tags, name, and textual description accurately reflect the nature of the media document), and edit the generated metadata, if necessary.

As described above, in some circumstances, the query may already be associated with partial metadata. However, through the process of identifying other metadata based on the similarity of the feature vectors of the media document of the query and the feature vector of the entries of the database, additional relevant metadata may be automatically generated. Furthermore, errors in the metadata of the query may also be corrected based on the automatically generated metadata.

The generated metadata may then be saved in association with the media document for use in other applications.

Searches Limited by Policies

One aspect of embodiments of the present invention relates to constraining the search of the database in accordance with access policies. For example, different users that are querying the database may search only the portions of the database to which they have access, based on policies. For instance, given five users <a1, a2, a3, b1, b2> in which users <a1, a2, a3> belong to group A, and <b1, b2> belong to the group B; and a database constituted by three sets of entries (or three sets of media documents) <dbA, dbB, dbC>, in which dbA is visible by members of group A, dbB is visible to members of group B, and dbC is visible to members of both groups A and B, the user b1 is allowed (permitted) to search only entries in dbB and dbC and is not allowed (denied) access to entries in dbA (and therefore the search is not performed on the entries in dbA). As such, the search performed by user b1 is restricted to entries in dbB and dbC. These policies can also be applied differently for different fields of the metadata. For example, the user b1 can be allowed to search in the entire database in order to populate the tags and the title field, but only dbB and dbC in order to populate the text field. Applications of these policies encompass the enforcement of digital rights for, for example, textual and visual information, classified information, proprietary information, and of adults-only or otherwise unsafe material search restriction.

Automatic Insertion of Entries into Database

According to one aspect of embodiments of the present invention, the media document of the query and its automatically generated metadata form a candidate for insertion into the database as a new entry and thus become an entry that can be further used for search and generation of metadata for further queries.

However, even if the automatically populated fields of the query after the search are verified by the user who is adding the entry to the database, this may not be enough to ensure the quality of the supplied metadata fields is sufficiently high to be safely used as an entry in the database. For example, an error in the metadata may cause a cascading effect in which a few incorrectly tagged entries can cause additional entries to be incorrectly tagged, thereby further increasing the likelihood that later queries will be incorrectly tagged. This is particularly true in the case in which these entries are used to train a classifier.

Therefore, in order to improve the likelihood that only queries characterized by high-quality metadata fields are incorporated as entries in the database, according to one embodiment of the present invention, new entries are subject to a probation time and democratic validation. In such embodiments, the query is temporarily added to the database as an entry. If this temporary entry is used to populate the missing metadata of a second query from a different user and the user validates the automatically-filled metadata fields, this entry is considered to be valid and is added to the pool of regular entries in the database. In another embodiment, a media document that is ready to be added to the pool of entries is validated by an administrator of the database before it can appear in search results.

Example of Model Capture with Automatic Metadata Generation

For the sake of clarity, a non-limiting example of the process of capturing a three-dimensional (3D) model and automatically generating metadata for the model according to one embodiment of the present invention is described below with respect to FIG. 8.

Figure 8:
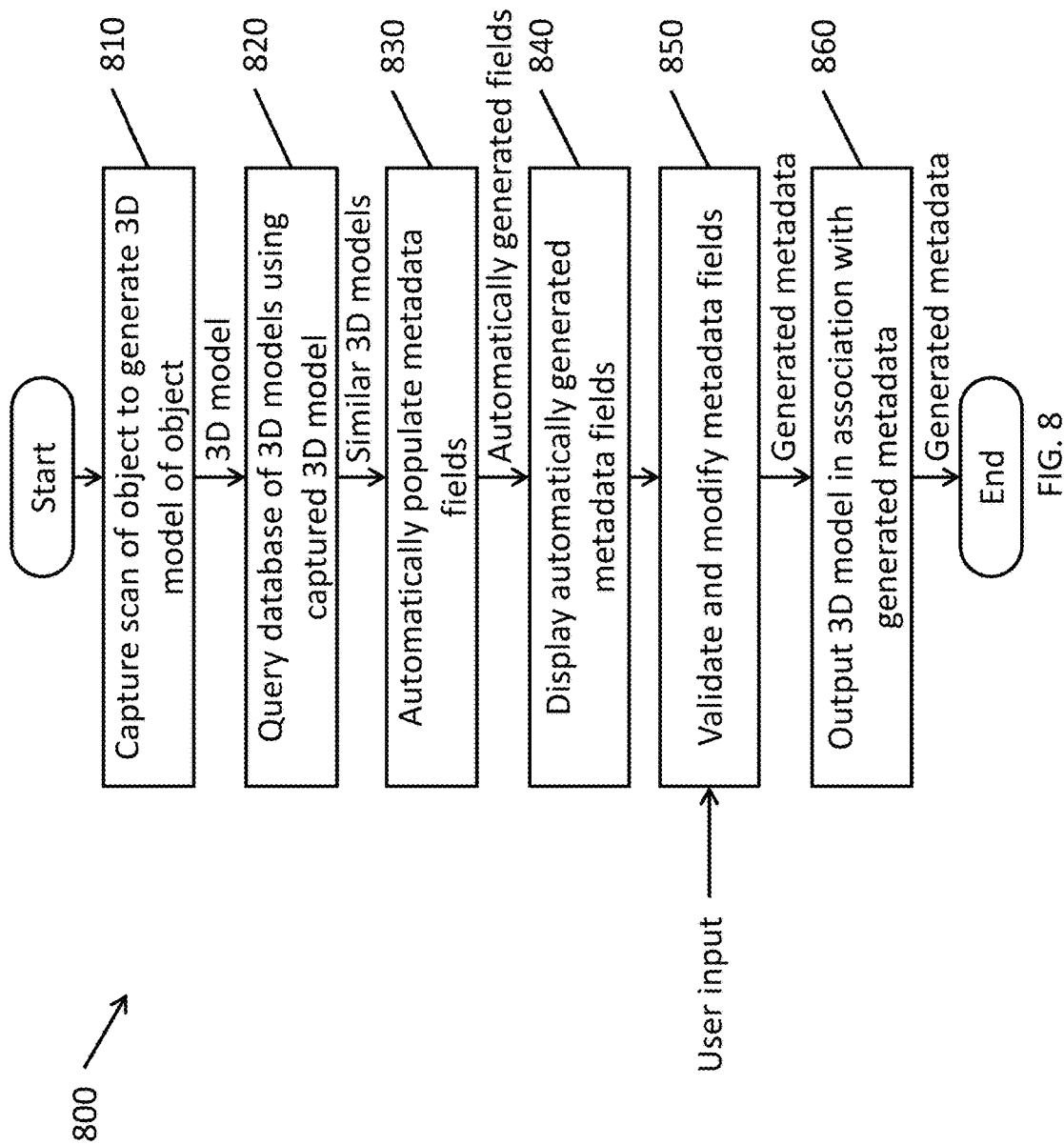
FIG. 8 is a flowchart depicting a process of capturing a model and automatically generating metadata for the model according to one embodiment of the present invention.

FIG. 8 is a flowchart depicting a process of capturing a model and automatically generating metadata for the model according to one embodiment of the present invention.

For the sake of convenience, the following example assumes the use of a 3D scanner such as a scanning system of the types described in U.S. patent application Ser. No. 15/630,715, filed in the United States Patent and Trademark Office on Jun. 22, 2017, the entire disclosure of which is incorporated herein by reference. Such a 3D scanner is able to acquire geometrical and textural information of a three-dimensional object.

In operation 810, 3D scanner acquires the three-dimensional geometry and of the texture of a particular physical three dimensional object, such as a lamp. A portion of the computation for computing the 3D geometry and texture of the captured raw data (e.g., two dimensional images) to generate a 3D model can be performed on the 3D scanner, while the remaining portion may be performed on a local or remote server. The output of this operation is a textured three-dimensional model (3D model) of the particular object (e.g., a 3D model of the lamp).

In operation 820, the database of 3D models is queried using the captured 3D model. For example, according to one embodiment of the present invention, the captured 3D model (e.g., the captured model of a lamp) is then uploaded to a local or remote server, which performs a search for this 3D model with respect to a database of classified and labeled 3D models. For the sake of convenience, it is assumed that all of the metadata fields (e.g., name, classes, tags, and textual description) of all of the models in the database are populated and that none of the metadata fields of the query model are populated.

The query of the database may be performed in substantially the same manner shown in operations 510 and 530 of FIG. 5. In operation 510, a feature vector is computed (or extracted) based on the 3D model of the query using a trained convolutional neural network (CNN). (The weights of the CNN that has been trained on such a database may be pre-computed, and the feature vectors for each of the 3D models in the database may be pre-computed using the same CNN and those feature vectors may be stored within the database.) The feature vector of the 3D model of the query can therefore be used for classification and retrieval purposes.

In operation 830, metadata fields are automatically generated for the 3D model of the query. As noted above, the classification may be a set of classes for the 3D model of the query when its feature vector is supplied to a classifier, and the retrieval output may be a set of entries having 3D models that are similar to the query model (e.g., having similar feature vectors). This set of similar entry models can be used for the automatic population of the metadata fields other than the class, such as the name, tags and textual description.

In operation 840, all of the automatically generated metadata fields for the 3D model supplied as the query have been populated by the server, and they are displayed to the user for validation. In operation 850, the user can validate and modify the automatically generated values of the metadata suggested by the server. Once the metadata is validated (and possibly edited), the resulting metadata can be output in operation 860, with the 3D model for use in other contexts, such as the creation of an e-commerce listing including a three-dimensional model, where the automatically generated metadata can be used to automatically fill various portions of the e-commerce listing.

Media Documents in E-Commerce Applications

As noted above, one example of an application of the automatic generation of metadata for media documents such as three-dimensional (3D) models with automatically generated metadata is in e-commerce applications. In particular, providing a 3D model of a product being sold may improve the shopping experience and result in increased shopper engagement by allowing the shopper to manipulate the product, virtually, within a 3D environment, thereby providing a more immersive understanding of the size and shape of the product. Furthermore, 2D images of a product being sold are commonplace and are typically expected by consumers.

In addition to the visual information about the product (e.g., images and three-dimensional models), listings on e-commerce applications generally include a large about of associated data, such as a name (or title), a textual description, tags (or keywords), and they are organized in classes (commonly called categories). In particular, in large electronic commerce websites, the listing categories may be in the order of many thousands or more, and they may be organized in a tree structure encoding sub-categories relationships, where each listed product may belong to one or more categories.

As such, when a seller wishes to list a product for sale, he or she must fill in these metadata fields for the product being sold. Generally, this is a manual process and may require substantial time and effort to collect the information requested by the product listing page and to complete the form. In particular, when the listing is created from a mobile platform (e.g., a smartphone), this operation can become very time-consuming and tedious.

As such, the automatic metadata generation according to aspects of embodiments of the present invention allows the metadata fields of e-commerce postings to be automatically populated using the captured media data (e.g., photographs of the product or a 3D scan of the object). While some embodiments of the present invention are described above with respect to two-dimensional images and three-dimensional models, embodiments of the present invention are not limited thereto, and may also be applied to other forms of media such as videos (e.g., feature vectors may be extracted from videos rather than 2D images or 3D models, and the resulting feature vectors may be used to classify the objects depicted in the images and to identify images and/or videos of similar objects in order to automatically retrieve metadata from those similar entries).

This automatic population of the various metadata fields (title, classes, tags, textual description) is obtained by means of a self-updating organized database of listings, which allows for efficient classification and retrieval operations.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for automatically generating metadata for a media document, the method comprising:
   computing a feature vector of the media document using a convolutional neural network, the media document being a three-dimensional (3D) model, the computing the feature vector comprising:
      rendering the 3D model from multiple angles to render a plurality of two-dimensional (2D) views of the 3D model;
      generating, using one or more convolutional neural networks, a plurality of single view feature vectors, each of the single view feature vectors corresponding to one of the 2D views of the 3D model;
      aggregating the plurality of single view feature vectors corresponding to the 2D views to compute a pooled feature vector, the pooled feature vector having a fixed length that is independent of the number of 2D views; and
      computing the feature vector from the pooled feature vector having the fixed length using a final stage convolutional neural network;
   searching a collection of media documents for one or more matching media documents having corresponding feature vectors similar to the feature vector of the media document, each media document of the collection of media documents being associated with metadata;
   generating metadata for the media document based on the metadata associated with the one or more matching media documents, the generated metadata comprising portions of the metadata that appear in at least a threshold number of the one or more matching documents; and
   displaying the media document in association with the generated metadata.

2. The method of claim 1, wherein the collection of media documents comprises a collection of two-dimensional (2D) images,
   wherein the computing the feature vector comprises computing one or more feature vectors of the 3D model,
   wherein the one or more matching media documents comprise one or more matching 2D images of the collection of 2D images, and
   wherein each of the corresponding feature vectors of the matching 2D images is similar to at least one of the one or more feature vectors of the 3D model.

3. The method of claim 1, further comprising:
   capturing the 3D model using a three-dimensional scanner, the three-dimensional scanner comprising:
      two or more infrared (IR) cameras; and
      one or more IR collimated illuminators.

4. The method of claim 1, further comprising receiving user input, the user input comprising a validation of one or more of a plurality of fields of the generated metadata.

5. The method of claim 1, wherein the generated metadata and the metadata associated with each of the media documents each comprise a plurality of fields, and
   wherein the generating the metadata comprises:
      identifying, for each field of the plurality of fields, data that appears in more than a threshold number of the metadata of the one or more matching media documents, and
      adding the identified data to the generated metadata.

6. The method of claim 1, wherein the generated metadata comprises a class of the media document, and
   wherein the method further comprises:
      supplying the feature vector of the media document to a classifier to compute classifications of the media document; and
      computing the class based on the classifications.

7. The method of claim 1, further comprising adding the media document and the generated metadata to the collection of media documents.

8. The method of claim 1, wherein each of the one or more corresponding feature vectors of the one or more matching media documents has a corresponding distance in multi-dimensional space from the feature vector of the media document, and
wherein each corresponding distance is less than a threshold distance.

9. The method of claim 1, further comprising receiving metadata associated with the media document,
wherein the searching the collection of media document comprises identifying one or more media documents of the collection of media documents having metadata matching at least one of a plurality of fields of the metadata associated with the media document, and
wherein the matching media documents comprise at least one of the identified one or more media documents.

10. The method of claim 1, wherein the collection of media documents comprises a first set of media documents and a second set of media documents,
wherein an access policy associated with a user permits access to the first set of media documents and denies access to the second set of media documents, and
wherein the searching the collection of media documents is restricted to the first set of media documents.

11. A system for automatically generating metadata for a media document, wherein the media document is a three-dimensional (3D) model, the system comprising:
a processor; and
memory having instructions stored thereon that, when executed by the processor, cause the processor to:
compute a feature vector of the media document using a convolutional neural network, wherein the instructions for computing the feature vector comprise instructions that, when executed by the processor, cause the processor to:
render the 3D model from multiple angles to render a plurality of two-dimensional (2D) views of the 3D model;
generate, using one or more convolutional neural networks, a plurality of single view feature vectors, each of the single view feature vectors corresponding to one of the 2D views of the 3D model;
aggregate the plurality of single view feature vectors to compute a pooled feature vector the pooled feature vector having a fixed length that is independent of the number of 2D views; and
compute the feature vector from the pooled feature vector using a final stage convolutional neural network;
search a collection of media documents for one or more matching media documents having corresponding feature vectors similar to the feature vector of the media document, each media document of the collection of media documents being associated with metadata;
generate metadata for the media document based on the metadata associated with the one or more matching media documents, the generated metadata comprising portions of the metadata that appear in at least a threshold number of the one or more matching media documents; and
display the media document in association with the generated metadata.

12. The system of claim 11, wherein the collection of media documents comprises a collection of two-dimensional (2D) images,
wherein the instructions for computing the feature vector comprise instructions that, when executed by the processor, cause the processor to compute one or more feature vectors of the 3D model,
wherein the one or more matching media documents comprise one or more matching 2D images of the collection of 2D images, and
wherein each of the corresponding feature vectors of the matching 2D images is similar to at least one of the one or more feature vectors of the 3D model.

13. The system of claim 11, further comprising a three-dimensional scanner comprising:
two or more infrared (IR) cameras; and
one or more IR collimated illuminators,
wherein the memory further stores instructions that, when executed by the processor, cause the processor to capture the 3D model using the three-dimensional scanner.

14. The system of claim 11, wherein the memory further stores instructions that, when executed by the processor, cause the processor to receive user input, the user input comprising a validation of one or more of a plurality of fields of the generated metadata.

15. The system of claim 11, wherein the generated metadata and the metadata associated with each of the media documents each comprise a plurality of fields, and
wherein the instructions for generating the metadata comprise instructions that, when executed by the processor, cause the processor to:
identify, for each field of the plurality of fields, data that appears in more than a threshold number of the metadata of the one or more matching media documents, and
add the identified data to the generated metadata.

16. The system of claim 11, wherein the generated metadata comprises a class of the media document, and
wherein the memory further stores instructions that, when executed by the processor, cause the processor to:
supply the feature vector of the media document to a classifier to compute classifications of the media document; and
compute the class based on the classifications.

17. The system of claim 11, wherein the memory further stores instructions that, when executed by the processor, cause the processor to add the media document and the generated metadata to the collection of media documents.

18. The system of claim 11, wherein each of the one or more corresponding feature vectors of the one or more matching media documents has a corresponding distance in multi-dimensional space from the feature vector of the media document, and
wherein each corresponding distance is less than a threshold distance.

19. The system of claim 11, wherein the memory further stores instructions that, when executed by the processor, cause the processor to receive metadata associated with the media document,
wherein the instructions for searching the collection of media document comprise instructions that, when executed by the processor, cause the processor to identify one or more media documents of the collection of media documents having metadata matching at least one of a plurality of fields of the metadata associated with the media document, and wherein the matching media documents comprise at least one of the identified one or more media documents.

20. The system of claim 11, wherein the collection of media documents comprises a first set of media documents and a second set of media documents,
    wherein an access policy associated with a user permits access to the first set of media documents and denies access to the second set of media documents, and
    wherein the searching the collection of media documents is restricted to the first set of media documents.

21. The method of claim 1, wherein the threshold number is specified as a count of matching documents containing a portion of the metadata.

22. The method of claim 1, wherein the threshold number is specified as a percentage of the one or more matching documents.

23. The system of claim 11, wherein the threshold number is specified as a count of matching documents containing a portion of the metadata.

24. The system of claim 11, wherein the threshold number is specified as a percentage of the one or more matching documents.

\* \* \* \* \*